(12) United States Patent
Kurata et al.

(10) Patent No.: US 11,377,051 B2
(45) Date of Patent: Jul. 5, 2022

(54) ELECTRIC JUNCTION BOX

(71) Applicant: YAZAKI CORPORATION, Tokyo (JP)

(72) Inventors: Sho Kurata, Makinohara (JP); Hideki Kawamura, Makinohara (JP); Minoru Umezaki, Makinohara (JP); Toshiki Yagi, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 99 days.

(21) Appl. No.: 17/061,580

(22) Filed: Oct. 2, 2020

(65) Prior Publication Data
US 2021/0101545 A1   Apr. 8, 2021

(30) Foreign Application Priority Data
Oct. 4, 2019   (JP) ............................. JP2019-183612

(51) Int. Cl.
| | |
|---|---|
| *H02G 3/16* | (2006.01) |
| *B60R 16/02* | (2006.01) |
| *B60R 16/023* | (2006.01) |
| *H02G 3/14* | (2006.01) |

(52) U.S. Cl.
CPC ........... *B60R 16/0239* (2013.01); *H02G 3/14* (2013.01)

(58) Field of Classification Search
CPC .......... H02G 3/08; H02G 3/081; H02G 3/088; H02G 3/14; H02G 3/083; H02G 3/16; H05K 5/00; H05K 5/02; H05K 5/0004; H05K 5/0091; H05K 5/0217; H05K 5/0204; B60R 16/02; B60R 16/0239; H01R 9/24; H01R 2201/26

USPC ........... 174/50, 520, 17 R, 535; 220/3.2–3.9, 220/4.02; 439/76.1, 76.2, 949; 361/600, 361/601, 622, 641, 837, 605
See application file for complete search history.

(56) References Cited

U.S. PATENT DOCUMENTS

| | | | | |
|---|---|---|---|---|
| 6,822,163 | B2* | 11/2004 | Saneto | B60R 16/0239 174/50 |
| 7,549,872 | B2* | 6/2009 | Akahori | H01R 13/514 439/76.2 |
| 7,893,364 | B2* | 2/2011 | Oda | H05K 7/026 174/50 |
| 7,939,754 | B2* | 5/2011 | Richter | H01R 13/6641 174/50 |
| 8,512,050 | B2* | 8/2013 | McGreevy | H02S 40/34 439/76.1 |
| 10,131,297 | B1* | 11/2018 | Kakimi | B60R 16/0207 |

(Continued)

FOREIGN PATENT DOCUMENTS

| | | |
|---|---|---|
| CN | 103221263 A | 7/2013 |
| CN | 103812061 A | 5/2014 |

(Continued)

*Primary Examiner* — Angel R Estrada
(74) *Attorney, Agent, or Firm* — Kenealy Vaidya LLP (57) ABSTRACT

An electric junction box includes a housing configured to accommodate an electronic component, and a lid portion attached to the housing so as to cover an opening of the housing. An electric wire connected to the electronic component is routed between the electronic component and the lid portion. The housing includes a fixing member fixing the electric wire. The fixing member has a face intersecting with an attachment direction of the lid portion and fixes the electric wire to the face.

5 Claims, 6 Drawing Sheets

(56) References Cited

U.S. PATENT DOCUMENTS

| | | | |
|---|---|---|---|
| 11,031,761 B2* | 6/2021 | Kurata | H02G 3/088 |
| 11,056,866 B2* | 7/2021 | Kakimi | H02G 3/088 |
| 2013/0228367 A1 | 9/2013 | Sato et al. | |
| 2014/0131061 A1 | 5/2014 | Hirasawa et al. | |
| 2018/0309279 A1 | 10/2018 | Kakimi et al. | |
| 2019/0058315 A1 | 2/2019 | Korez et al. | |

FOREIGN PATENT DOCUMENTS

| | | | |
|---|---|---|---|
| CN | 108736404 A | 11/2018 | |
| JP | 2010-93964 A | 4/2010 | |
| JP | 2010-124561 A | 6/2010 | |
| JP | 2011-15466 A | 1/2011 | |
| JP | 2011-55579 A | 3/2011 | |
| JP | 2015-156752 A | 8/2015 | |

\* cited by examiner

ELECTRIC JUNCTION BOX

CROSS REFERENCE TO RELATED APPLICATIONS

This application claims priority from Japanese Patent Application No. 2019-183612 filed on Oct. 4, 2019, the entire contents of which are incorporated herein by reference.

BACKGROUND OF THE INVENTION

Field of the Invention

The present invention relates to an electric junction box such as a fuse box or a junction box.

Description of Related Art

The electric junction box described above includes a housing for accommodating an electronic component such as a fuse or an electric wire connected to the electronic component, and a lid portion for covering an opening of the housing, as described in Patent Literatures 1 to 5. The above electric wire is routed in an accommodating space between the electronic component accommodated in the housing and the lid portion. However, when the accommodating space is small, there is a problem that the electric wire presses the lid portion to swell the lid portion.

Patent Literature 1 (JP-A-2015-156752) proposes a device for fixing a tying band in which electric wires are bundled to a side face of a pillar provided upright toward the lid portion. However, even when the electric wires are fixed to the side face of the pillar, it is not possible to prevent the swelling of the electric wire toward the lid portion, and it is not possible to prevent the electric wire from pressing the lid portion to swell the lid portion.

[Patent Literature 1] JP-A-2015-156752
[Patent Literature 2] JP-A-2011-15466
[Patent Literature 3] JP-A-2010-93964
[Patent Literature 4] JP-A-2011-55579
[Patent Literature 5] JP-A-2010-124561

SUMMARY

According to one or more embodiments, an electric junction box includes a housing configured to accommodate an electronic component, and a lid portion attached to the housing so as to cover an opening of the housing. An electric wire connected to the electronic component is routed between the electronic component and the lid portion. The housing includes a fixing member fixing the electric wire. The fixing member has a face intersecting with an attachment direction of the lid portion and fixes the electric wire to the face.

DETAILED DESCRIPTION

An electric junction box 1 according to the present embodiment is to be mounted on, for example, a vehicle, and is to be interposed between a power source (secondary battery) and an electronic device of a vehicle (not shown) to adjust electric power supplied from the power source to the electronic device. The electric junction box 1 may also be referred to as a relay box, a fuse box, a junction box, or the like.

Figure 1:
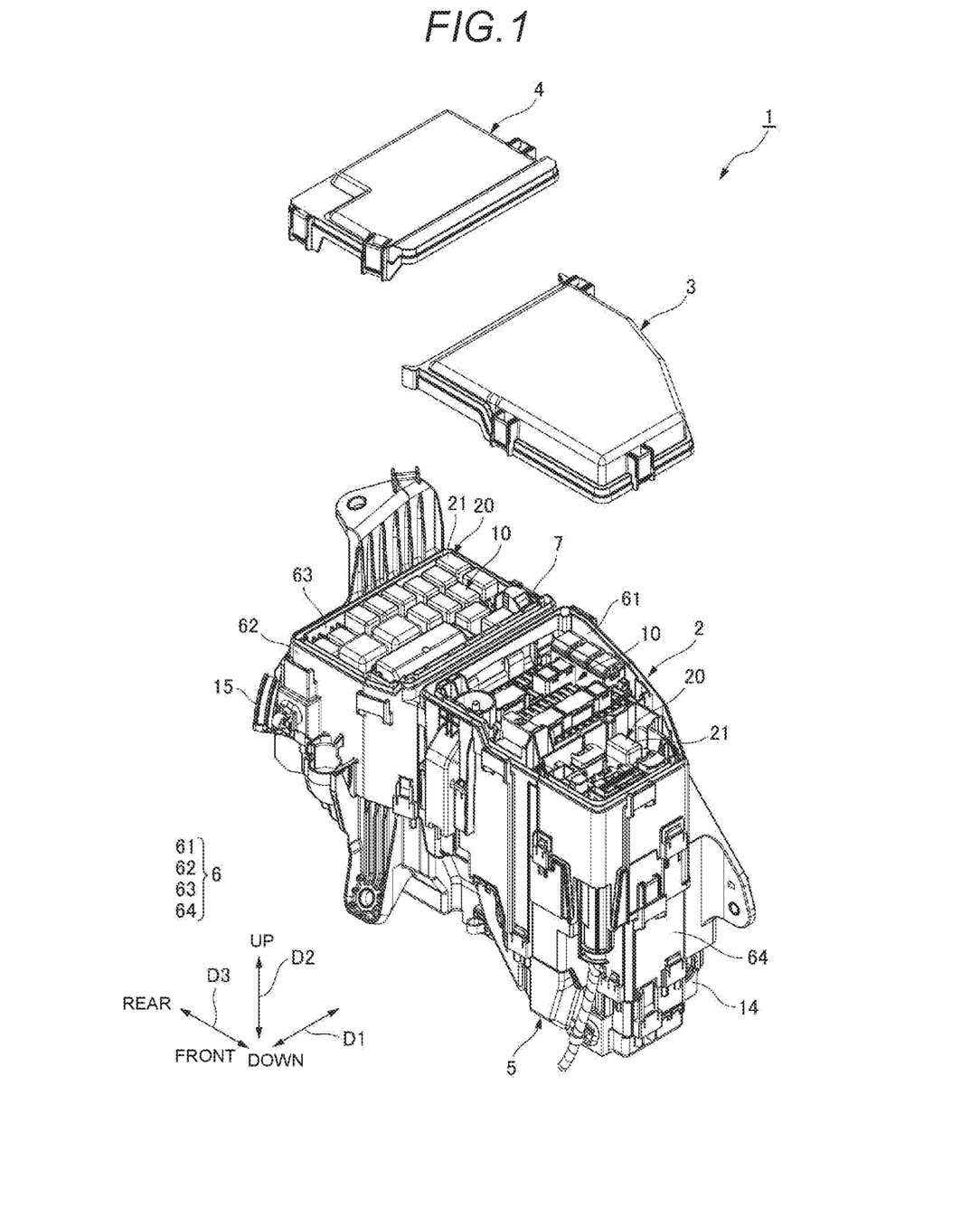
FIG. 1 is an exploded perspective view of an electric junction box according to the present embodiment, with an upper cover thereof removed.
Figure 2:
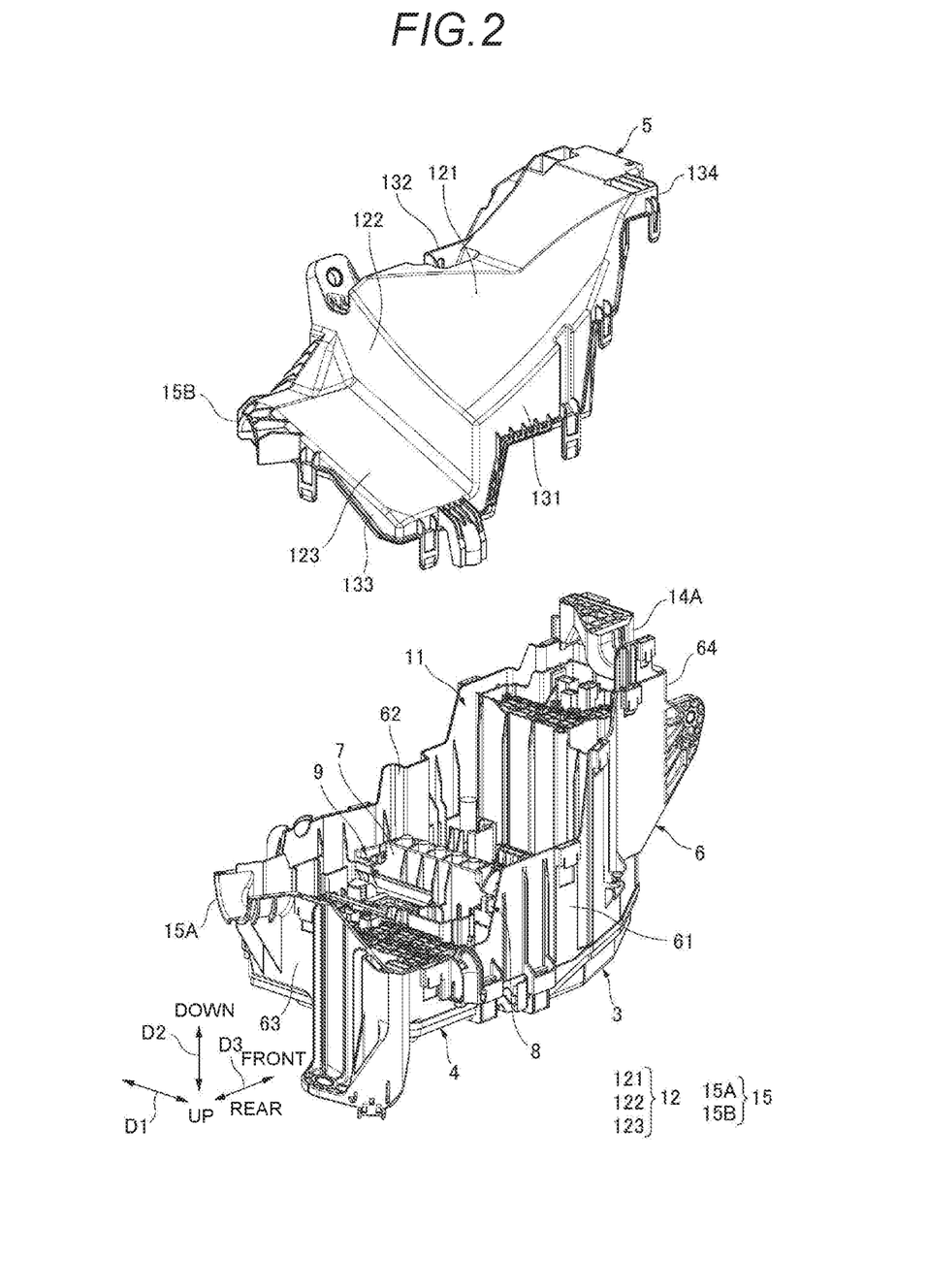
FIG. 2 is an exploded perspective view of the electric junction box shown in FIG. 1 with a lower cover thereof removed.

The electric junction box 1 according to the present embodiment accommodates electronic components 20 (FIG. 1) and electric wires L1, L2 (FIG. 5) connected to the electronic components 20. The electric junction box 1 is to be disposed in an engine room provided on a front side of a vehicle. As shown in FIG. 1 and FIG. 2, the electric junction box 1 includes a housing 2, a first upper cover 3, a second upper cover 4, and a lower cover (lid portion) 5. The housing 2 includes a cylindrical portion 6 formed in a cylindrical shape, a partition wall 7 for partitioning the inside of the cylindrical portion 6 into two areas, and electric wire fixing portions (fixing members) 8, 9 for fixing the electric wire L2 provided on the partition wall 7.

The cylindrical portion 6 has openings 10, 11 each formed in a substantially rectangular prismatic shape. The opening 10 on one side in a cylindrical length direction is closed by the first upper cover 3 and the second upper cover 4, and the opening 11 on the other side is closed by the lower cover 5. The cylindrical length direction is arranged along an up-down direction D2 of the vehicle such that the opening 10 closed by the first upper cover 3 and the second upper cover 4 is directed upward and the opening 11 closed by the lower cover 5 is directed downward in the cylindrical portion 6. In addition, the cylindrical portion 6 is disposed in a manner that longitudinal directions of the substantially rectangular openings 10, 11 are along a front-rear direction D3 of the vehicle and lateral directions thereof are along a left-right direction D1 of the vehicle.

The cylindrical portion 6 has first and second side walls 61, 62 disposed along the front-rear direction D3, and third and fourth side walls 63, 64 disposed along the left-right direction D1. The cylindrical portion 6 is formed in a rectangular cylindrical shape by connecting the third side wall 63 between rear ends of the first and second side walls 61, 62 and connecting the fourth side wall 64 between front ends of the first and second side walls 61 and 62. Lower ends of the first and second side walls 61, 62 include a plurality of steps, and therefore are formed in a step shape whose height decreases towards the rear side of the housing 2.

Figure 3:
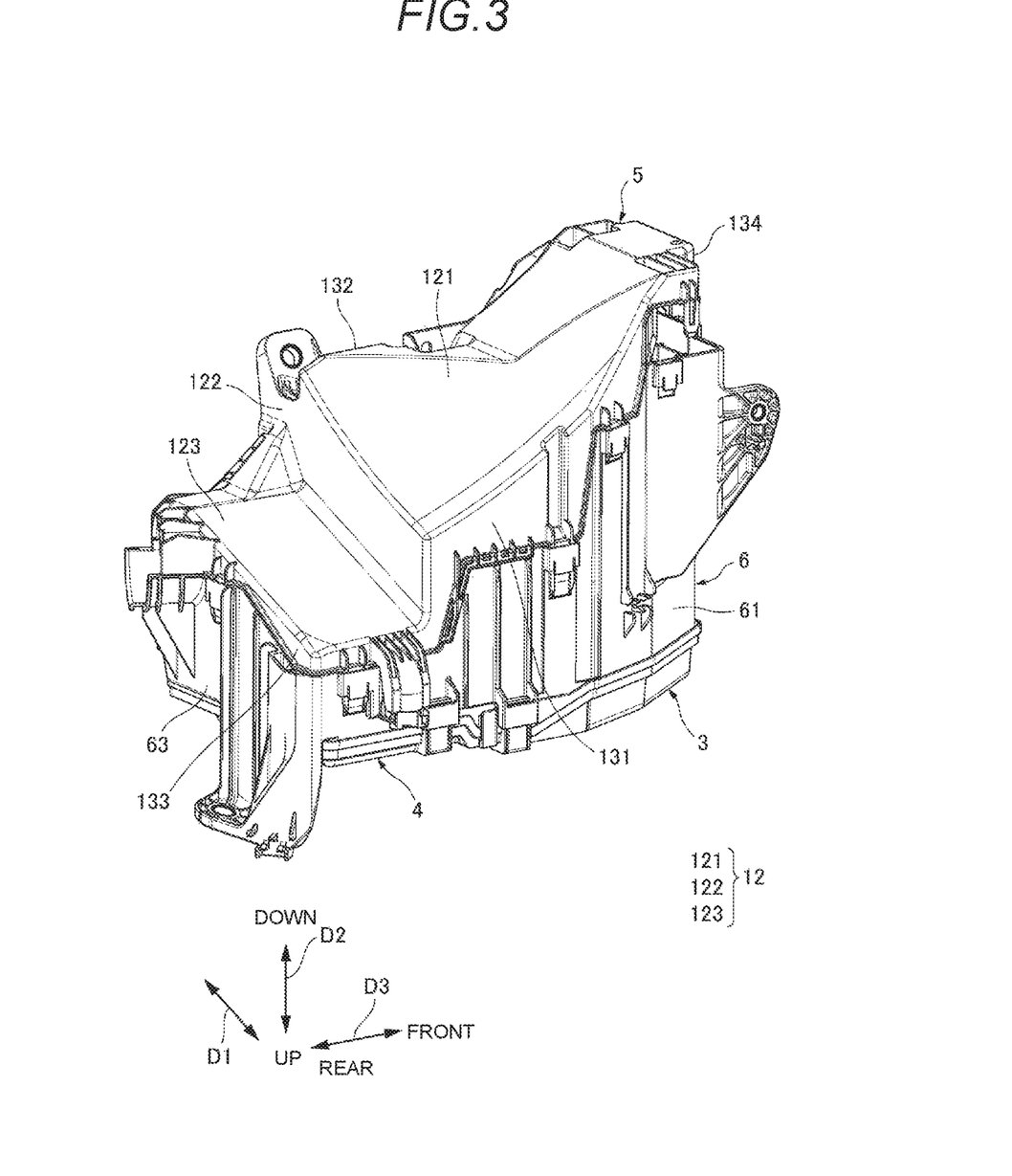
FIG. 3 is a perspective view of the electrical junction box shown in FIG. 1 and FIG. 2 as viewed from below.

Next, the configuration of the lower cover 5 will be described before describing the partition wall 7 and the electric wire fixing portions 8, 9 of the housing 2. The lower cover 5 is attached to the housing 2 so as to approach the housing 2 along the up-down direction D2 (attachment direction) and close the opening 11 of the housing 2. As shown in FIG. 2, the lower cover 5 has a bottom wall 12 covering the opening 11 of the housing 2, and first to fourth side walls 131 to 134 provided upright from a peripheral edge of the bottom wall 12. The bottom wall 12 is to be mounted on the vehicle body and has a shape matching a shape of the vehicle body. In the present embodiment, the bottom wall 12 includes a front side wall portion 121, a stepped wall portion 122, and a rear side wall portion 123. The front side wall portion 121 includes a horizontal plane extending from a front end toward a rear side and perpendicular to the up-down direction D2, and a plurality of inclined faces inclined upward toward the rear side. The stepped wall portion 122 is provided upright from a rear end to an upper side of the front side wall portion 121 and is substantially perpendicular to the front-rear direction D3. The rear side wall portion 123 extends from an upper end to a rear side of the stepped wall portion 122. As shown in FIG. 3, the stepped wall portion 122 is provided at a position slightly rearward of the third step from the front of the first side wall 61.

The first and second side walls 131, 132 are provided along the front-rear direction D3, and the third and fourth side walls 133, 134 are provided along the left-right direction D1. The lower cover 5 is formed in a rectangular cylindrical shape by connecting the third side wall 133 between rear ends of the second side walls 131, 132 and connecting the fourth side wall 134 between front ends of the first and second side walls 131, 132. Upper end portions of the first to fourth side walls 131 to 134 are stacked inside lower end portions of the first to fourth side walls 61 to 64 of the cylindrical portion 6. The upper ends of the first and second side walls 131, 132, which are stacked inside the lower end portions of the first and second side walls 61, 62 of the cylindrical portion 6, are formed in a step shape having a plurality of steps, like lower end shapes of the first and second side walls 131, 132.

Figure 4:
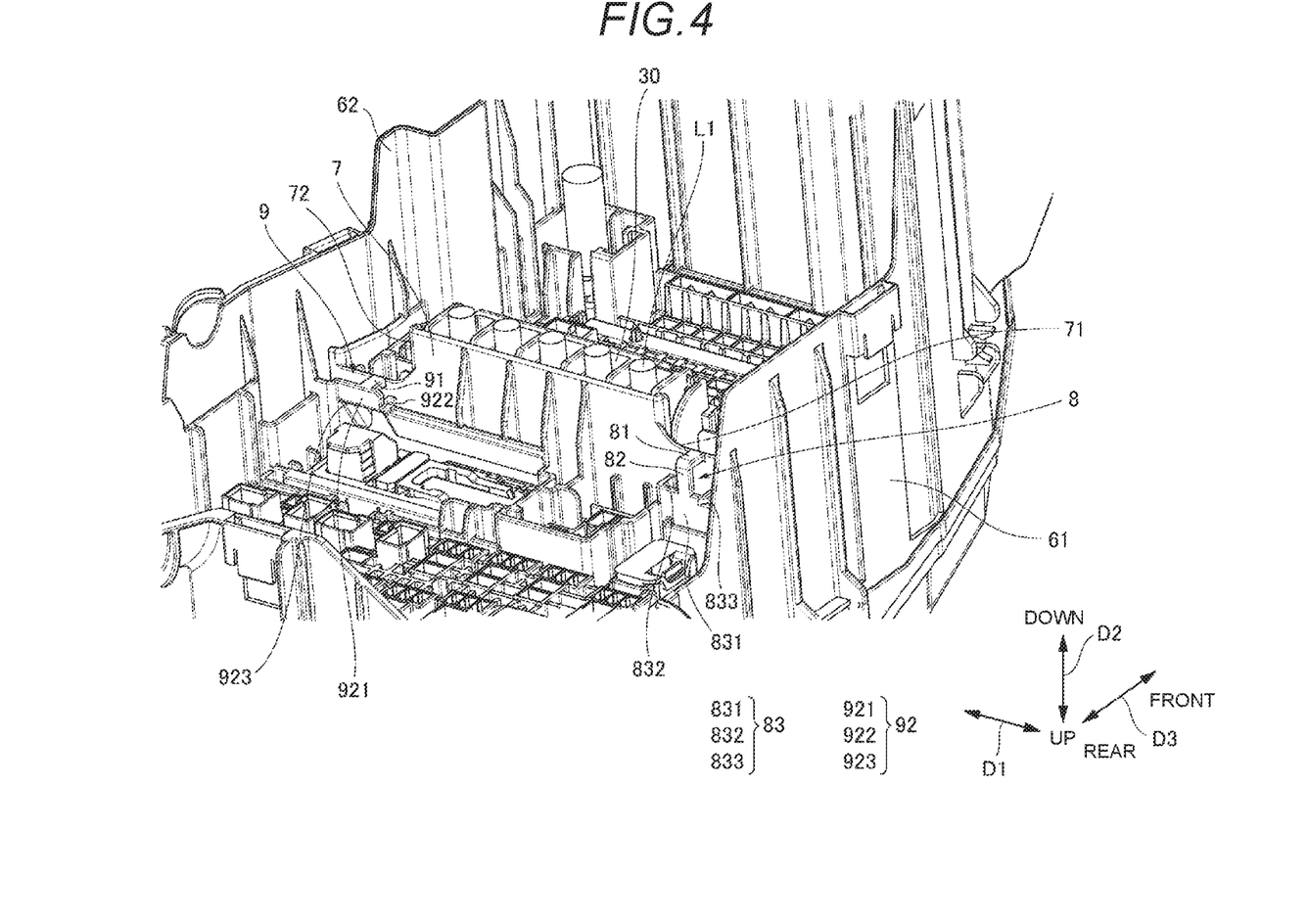
FIG. 4 is a partially enlarged perspective view of a housing shown in FIG. 2.
Figure 5:
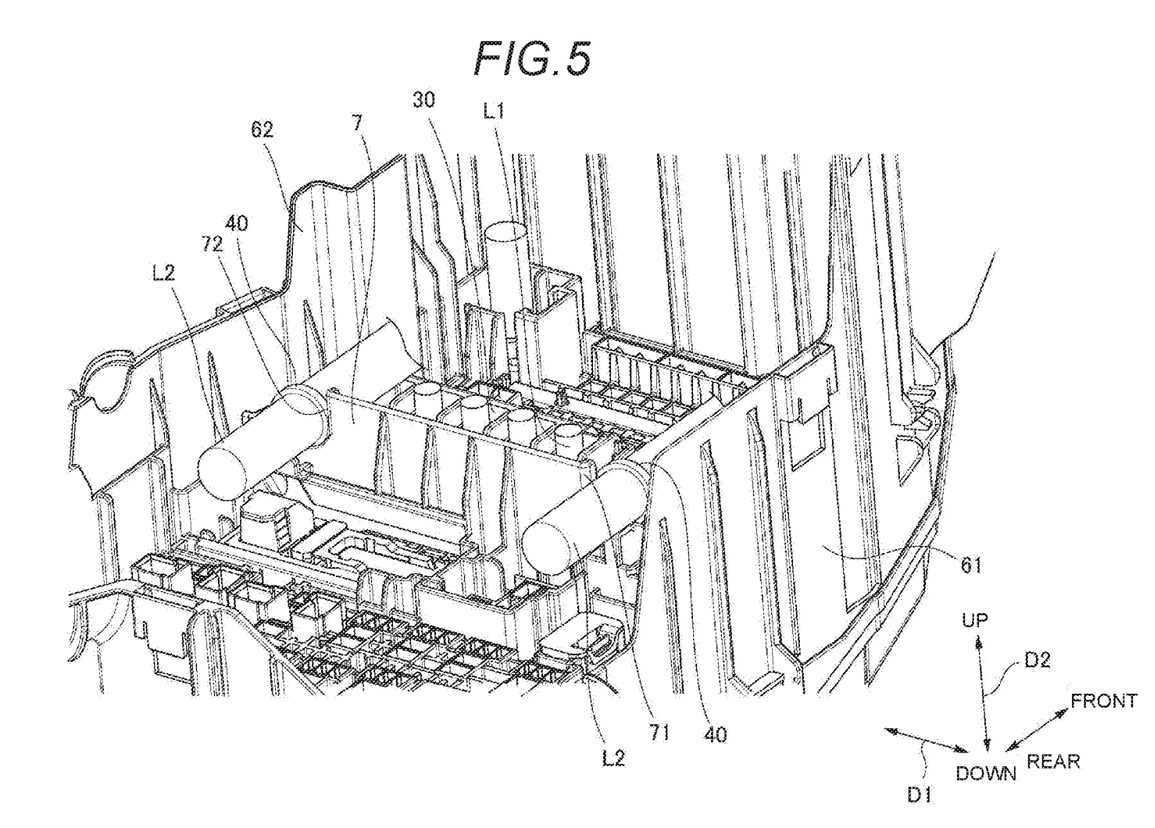
FIG. 5 is a partially enlarged view of a state where electric wires are routed in the housing shown in FIG. 4.

The configuration of the housing 2 will be described. As shown in FIG. 2, FIG. 4, and FIG. 5, the partition wall 7 of the housing 2 is provided in the cylindrical portion 6 to be orthogonal to the front-rear direction D3, and two ends thereof in the left-right direction D1 are connected to the first and second side walls 61, 62 of the cylindrical portion 6. That is, the partition wall 7 partitions the inside of the cylindrical portion 6 into two areas arranged in the front-rear direction D3. In the present embodiment, in the two areas, a front area in the front-rear direction D3 serves as a user maintenance area, and a rear area in the front-rear direction D3 serves as a dealer maintenance area. The user maintenance area accommodates electronic components 20 to be maintained by a user. The dealer maintenance area accommodates electronic components 20 to be maintained by a dealer. The opening 10 above the dealer maintenance area is covered by the first upper cover 3, and the opening 10 above the user maintenance area is covered by the second upper cover 4. In addition, in the present embodiment, the partition wall 7 is connected to a position slightly ahead of the third step from the front of the first side wall 61.

The electronic component 20 refers to a relay, a fuse, a fusible link, or the like. The electronic component 20 includes a housing 21 (FIG. 1) having a built-in electronic component body (not shown) such as a relay body and a fuse body, and a terminal portion (not shown) connected to the electronic component body. The terminal portion is provided to protrude from the housing 21. The electronic component 20 is accommodated in the cylindrical portion 6 with the housing 21 on the upper side and the terminal portion (not shown) on the lower side. The electric wires L1, L2 accommodated in the electric junction box 1 are connected to the terminal portion via a mating terminal (not shown). That is, the electric wires L1, L2 are disposed below the electronic component 20 and are routed between the electronic component 20 and the lower cover 5. The electric wires L1, L2 connected to the electronic component 20 are drawn out of the electric junction box 1 through electric wire draw-out ports 14, 15 (see FIG. 1) provided on side faces of the electric junction box 1 in the front-rear direction D3.

As shown in FIG. 2, the electric wire draw-out port 14 includes a gutter-like portion 14A having a U-shaped cross section formed on the housing 2 and a gutter-like portion (not shown) having a U-shaped cross section formed on the lower cover 5. The gutter-like portion 14A is provided to protrude inward from an edge portion of a semicircular notch provided at the lower end of the fourth side wall 64. The gutter-like portion (not shown) formed on the lower cover 5 is provided to protrude inward from an edge portion of a semicircular notch provided at the upper end of the fourth side wall 134. The gutter-like portion 14A on the cylindrical portion 6 and the gutter-like portion (not shown) on the lower cover 5 are vertically stacked with each other to form the electric wire draw-out port 14.

The electric wire draw-out port 15 is includes a gutter-like portion 15A having a U-shaped cross section formed on the housing 2 and a gutter-like portion 15B having a U-shaped cross section formed on the lower cover 5. The gutter-like portion 15A is provided to protrude outward from an edge portion of a semicircular notch provided at the lower end of the third side wall 63. The gutter-like portion 15b is provided to protrude outward from an edge portion of a semicircular notch provided at the upper end of the third side wall 133. The gutter-like portions 15A on the cylindrical portion 6 and the gutter-like portion 15B on the lower cover 5 are vertically stacked with each other to form the electric wire draw-out port 15.

Further, in the present embodiment, as shown in FIG. 4 and FIG. 5, the dealer maintenance area is provided with a multi-fusible link portion 30 (hereinafter abbreviated as "multi-FL portion") as an electronic component. The multi-FL portion 30 is provided long in the left-right direction D1 and is adjacent to a front side of the partition wall 7. Both end portions of the multi-FL portion 30 in the left-right direction D1 are provided at positions away from the first and second side walls 61, 62. A so-called thick electric wire L1 capable of passing a large current is connected to the multi-FL portion 30. In the present embodiment, five electric wires L1 are arranged in the left-right direction D1 and connected to the multi-FL portion 30. Therefore, as shown in FIG. 5, the electric wires L2 routed over the dealer maintenance area and the user maintenance area are routed along the first side wall 61 and the second side wall and 62 on both sides of the multi-FL portion 30 in the left-right direction D1 while circumventing the multi-FL portion 30 at a center in the left-right direction D1. The electric wire L2 may be one so-called thick electric wire or an electric wire bundle in which a plurality of electric wires are bundled.

In the present embodiment, a pair of notches 71, 72 is provided at a lower end of the partition wall 7. In the present embodiment, the pair of notches 71, 72 is provided at two end portions of the partition wall 7 in the left-right direction D1. When the electric wire L2 circumventing the multi-FL portion 30 is inserted into the notch 71 or 72, the electric wire L2 is sandwiched between the partition wall 7 and the first or second side wall 61 or 62 in the left-right direction D1. Accordingly, the position of the electric wire L2 in the left-right direction D1 (direction orthogonal to the up-down direction D2 (attachment direction) on the partition wall 7) can be regulated.

The periphery of the partition wall 7 is near the stepped wall portion 122 of the lower cover 5 as described above. Therefore, the accommodating space for accommodating the electric wire L2 is very small (that is, a distance between the bottom wall 12 of the lower cover 5 and an upper end of the partition wall 7 is short). In addition, since the electric wires L1, L2 are fitted and connected to the electronic component 20 in the up-down direction D2, the electric wire L2 swells toward a lower cover 5 side. Accordingly, the electric wire L2 presses the lower cover 5 to swell the lower cover 5. Therefore, in the present embodiment, the electric wire fixing portions 8, 9 are provided on upper sides of the notches 71, 72 (sides away from the lower cover 5), respectively.

As shown in FIG. 4, the electric wire fixing portion 8 includes a first arm portion (arm portion) 81, a second arm portion 82, and a support portion 83. The first arm portion 81 is formed in a rod shape, protrudes to a rear side from an upper end of the notch 71 provided in the partition wall 7, and extends in the front-rear direction D3. The second arm portion 82 is formed in a rod shape, and is provided upright from a rear end portion to an upper side of the first arm portion 81. The support portion 83 supports an upper end of the second arm portion 82.

The support portion 83 has a first wall portion 831, a second wall portion 832, and a third wall portion 833. The first wall portion 831 is provided away from the partition wall 7 in the front-rear direction D3. The first wall portion 831 is provided to be in parallel with the partition wall 7. The upper end of the second arm portion 82 is connected to a lower end of the first wall portion 831.

The second wall portion 832 and the third wall portion 833 are provided away from each other in the left-right direction D1. The second wall portion 832 and the third wall portion 833 protrude from the partition wall 7 to the rear side, and rear ends thereof are connected to the first wall portion 831. Accordingly, the first wall portion 831 can be supported at a position away from the partition wall 7 in the front-rear direction D3.

The electric wire fixing portion 9 includes a third arm portion (arm portion) 91 and a support portion 92. The third arm portion 91 is formed in a rod shape, protrudes to a rear side from an upper end of the notch 72 provided in the partition wall 7, and extends in the front-rear direction D3. The support portion 92 supports the third arm portion 91. The support portion 92 has a fourth wall portion 921, a fifth wall portion 922, and a six wall portion 923. The fourth wall portion 921 is provided away from the partition wall 7 in the front-rear direction D3. The fourth wall portion 921 is provided to be in parallel with the partition wall 7. The fifth wall portion 922 and the six wall portion 923 protrude from the partition wall 7 to the rear side, and rear ends and upper ends thereof are connected to a lower end of the fourth wall portion 921. Accordingly, the fourth wall portion 921 can be supported at a position away from the partition wall 7 in the front-rear direction D3.

Figure 6:
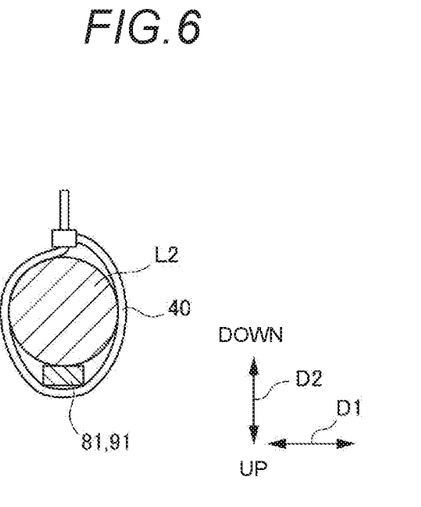
FIG. 6 is a partial cross-sectional view of an electric wire fixing portion shown in FIG. 5.

As shown in FIG. 6, the electric wire L2 is disposed to pass through the notches 71, 72 below the first and third arm portions 81, 91. When the first or third arm portion 81 or 91 and the electric wires L2 are tied together to pass through the tying band 40, the electric wire L2 can be fixed to a lower face of the first or third arm portion 81 or 91. The lower face of the first or third arm portions 81 or 91 is a face intersecting with the attachment direction of the lower cover 5 (up-down direction D2). Accordingly, the swelling of the electric wire L2 toward the lower cover 5 can be prevented.

According to the embodiment described above, the housing 2 includes the electric wire fixing portions 8, 9 for fixing the electric wire L2 on the face intersecting with the attachment direction of the lower cover 5 (up-down direction D2). Accordingly, the swelling of the electric wire L2 toward the lower cover 5 can be prevented, and the swelling of the lower cover 5 can be prevented.

According to the embodiment described above, the electric wire L2 is routed along the first or second side wall 61 or 62 of the cylindrical portion 6. As a result, when the electric wire L2 and the first or second side wall 61 or 62 are close to each other, the electric wire L2 is likely to be stuck between the housing 2 and the lower cover 5. However, in the present embodiment, the electric wire L2 is fixed to the housing 2 by the electric wire fixing portion 8 or 9, so that the swelling of the electric wire L2 toward the lower cover 5 can be prevented, and the electric wire L2 can be prevented from being stuck between the housing 2 and the lower cover 5.

According to the embodiment described above, the electric wire fixing portions 8, 9 are provided on the partition wall 7 for partitioning the inside of the cylindrical portion 6. Accordingly, it is not necessary to provide, separately from the partition wall 7, a wall portion for providing the electric wire fixing portions 8, 9, so that space saving can be achieved.

According to the embodiment described above, the electric wire fixing portions 8, 9 are provided on the sides of the notches 71, 72 of the partition wall 7 away from the lower cover 5. Accordingly, the electric wire L2 can be fixed with the electric wire L2 inserted in the notches 71, 72 of the partition wall 7, so that the position of the electric wire L2 in the left-right direction D1 can be regulated.

According to the embodiment described above, the electric wire fixing portions 8, 9 respectively include the rod-shaped first and third arm portions 81, 91 passing through the tying band 40 wound around the electric wire L2. Accordingly, the electric wire L2 can be fixed with the electric wire fixing portions 8, 9 having a simple configuration having the first and third arm portions 81, 91.

The present invention is not limited to the embodiment described above, and can be modified, improved, and the like as appropriate. In addition, the material, shape, dimension, number, arrangement position, or the like of each component in the above embodiment are optional and are not limited as long as the present invention can be achieved.

According to the embodiment described above, the electric wires L2 routed on both sides of the housing 2 in the left-right direction D1 are fixed by the electric wire fixing portions 8, 9, but the routing position of the electric wire L2 is not limited to this. The electric wire L2 may be routed between the electronic component 20 disposed in the housing 2 and the lower cover 5. For example, the electric wire L2 routing at the center of the housing 2 in the left-right direction D1 may be fixed by the electric wire fixing portions 8, 9.

According to the embodiment described above, the electric wire fixing portions 8, 9 are provided on the partition wall 7, but the invention is not limited to this. The electric wire fixing portions 8, 9 may be provided on the housing 2, for example, may be provided on the first and second side walls 61, 62.

According to the embodiment described above, the notches 71, 72 are provided in the partition wall 7 and the electric wire L2 is inserted into the notches 71, 72, but the invention is not limited to this. It is not essential and it is not necessary to provide the notches 71, 72 in the partition wall 7.

According to the embodiment described above, the first and third arm portions 81, 91 are provided to extend in the front-rear direction D3 which is a routing direction of the electric wire L2, but the present invention is not limited to this. The first and third arm portions 81, 91 may extend in a direction intersecting with the up-down direction D2, for example, may extend in the left-right direction D1.

According to the embodiment described above, the electric wire fixing portions 8, 9 respectively include the rod-shaped first and third arm portions 81, 91 passing through the tying band 40 wound around the electric wire L2, but the present invention is not limited to this. The electric wire fixing portions 8, 9 may each include a clamp for holding and fixing the electric wire L2. As long as the clamp fixes both sides of the electric wire L2 in the up-down direction D2, the electric wire L2 can be fixed to a face of the clamp intersecting with the up-down direction D2.

Here, characteristics of the embodiment of the electric junction box 1 described above are summarized briefly in the following [1] to [5].

[1] An electric junction box (1) comprising:
a housing (2) configured to accommodate an electronic component (20); and
a lid portion (5) attached to the housing (2) so as to cover an opening (11) of the housing (2),
wherein an electric wire (L2) connected to the electronic component (20) is routed between the electronic component (20) and the lid portion (5),
wherein the housing (2) includes a fixing member (8, 9) fixing the electric wire (L2), and
wherein the fixing member (8, 9) has a face (lower face of 81) intersecting with an attachment direction (D2) of the lid portion (5), and fixes the electric wire (L2) to the face (lower face of 81).

[2] The electric junction box (1) according to [1],
wherein the housing (2) has a side wall (61, 62) formed in a cylindrical shape, and
wherein the electric wire (L2) is routed near the side wall (61, 62).

[3] The electric junction box (1) according to [1],
wherein the housing (2) includes a cylindrical portion (6) formed in a cylindrical shape and a partition wall (7) partitioning an inside of the cylindrical portion (6), and
wherein the fixing member (8, 9) is provided on the partition wall (7).

[4] The electric junction box (1) according to [3],
wherein the partition wall (7) is provided with a notch (71, 72) at an end portion on a lid portion (5) side, and
wherein the fixing member (8, 9) is provided on a side of the notch (71, 72) away from the lid portion (5).

[5] The electric junction box (1) according to any one of [1] to [4],
wherein the fixing member (8, 9) includes a rod-shaped arm portion (81, 91) extending in a direction intersecting with the attachment direction (D2), and
wherein the arm portion (81, 91) is passed through a tying band (40) wound around the electric wire (L2) to fix the electric wire (L2).

According to the aspect [1], the fixing member has the face intersecting with the attachment direction of the lid portion, and fixes the electric wire to the face. Accordingly, swelling of the electric wire toward the lid portion can be prevented, and swelling of the lid portion can be prevented.

According to the aspect [2], the electric wire is routed near the side wall. Accordingly, the electric wire can be prevented from being stuck between the housing and the lid portion.

According to the aspect [3], the fixing member is provided on the partition wall for partitioning the inside of the cylindrical portion. Accordingly, it is not necessary to provide, separately from the partition wall, a wall portion for providing the fixing member, so that space saving can be achieved.

According to the aspect [4], the fixing member is provided on the side of the notch of the partition wall away from the lid portion. Accordingly, the electric wire can be fixed with the electric wire inserted in the notch of the partition wall, so that the position of the electric wire on the partition wall in a direction orthogonal to the attachment direction can be regulated.

According to the aspect [5], the electric wire can be fixed with the fixing member having a simple configuration having an arm portion.

According to one or more embodiments, it is possible to provide an electric junction box capable of preventing the swelling of the electric wire toward the lid portion and preventing the swelling of the lid portion.

What is claimed is:
1. An electric junction box comprising:
a housing configured to accommodate an electronic component; and
a lid portion attached to the housing so as to cover an opening of the housing,
wherein an electric wire connected to the electronic component is routed between the electronic component and the lid portion,
wherein the housing includes a fixing member fixing the electric wire, and
wherein the fixing member has a face intersecting with an attachment direction of the lid portion and the electric wire is fixed onto the face at a position on the fixing member that locates the electric wire between the face and the lid in the attachment direction,
wherein the housing includes a partition wall partitioning an inside of the housing, and
wherein the face extends from the partition wall.

2. The electric junction box according to claim 1,
wherein the housing has a side wall formed in a cylindrical shape, and
wherein the electric wire is routed near the side wall.

3. The electric junction box according to claim 1,
wherein the housing includes a cylindrical portion formed in a cylindrical shape and the partition wall partitioning an inside of the cylindrical portion.

4. The electric junction box according to claim 3,
wherein the partition wall is provided with a notch at an end portion on a lid portion side, and
wherein the fixing member is provided on a side of the notch away from the lid portion.

5. An electric junction box comprising:
a housing configured to accommodate an electronic component; and
a lid portion attached to the housing so as to cover an opening of the housing, and
a tying band;
wherein an electric wire connected to the electronic component is routed between the electronic component and the lid portion,
wherein the housing includes a fixing member fixing the electric wire, and
wherein the fixing member has a face intersecting with an attachment direction of the lid portion and the electric wire is fixed onto the face,
wherein the fixing member includes a rod-shaped arm portion extending in a direction intersecting with the attachment direction, and wherein the tying band is wound around the electric wire to form a loop and the arm portion is passed through the loop to fix the electric wire.

\* \* \* \* \*